US005414853A

United States Patent [19]
Fertig et al.

[11] Patent Number: 5,414,853
[45] Date of Patent: May 9, 1995

[54] APPARATUS AND METHOD FOR CHECKING MICROCODE WITH A GENERATED RESTRICTION CHECKER

[75] Inventors: Paul Fertig; Igal Golan, both of Haifa, Israel

[73] Assignee: International Business Machines Corporation, Armonk, N.Y.

[21] Appl. No.: 969,681

[22] Filed: Oct. 30, 1992

[30] Foreign Application Priority Data

Nov. 1, 1991 [IL] Israel .................. 0/099927

[51] Int. Cl.6 ............................................. G06F 11/00
[52] U.S. Cl. .................... 395/700; 364/946.6
[58] Field of Search ................ 395/700; 364/DIG. 1, 364/DIG. 2

[56] References Cited

U.S. PATENT DOCUMENTS 4,617,643 10/1986 Klock et al. .................. 364/900
4,729,096 3/1988 Larson .................. 364/300
4,989,145 1/1991 Kyushima .................. 364/419

Primary Examiner—Kevin A. Kriess
Assistant Examiner—Matthew M. Payne
Attorney, Agent, or Firm—Richard E. Billion; Roy W. Truelson

[57] ABSTRACT

A restriction checker generator is disclosed for generating a restriction checker capable of checking horizontal microcode instructions against restrictions which the microcode instructions must satisfy in order to be valid. The generator comprises means for transforming information representing each restriction into at least one logical test for the instruction, each logical test comprising a number of sub-tests for the values of fields of the instruction such that failure of any one of the sub-tests by an instruction indicates that the restriction is satisfied by the instruction. The sub-tests can be set-membership tests or arithmetic tests. An embodiment of the invention includes means for factorizing the logical tests so that, for at least some of the sub-tests, if the same sub-test occurs in a plurality of the logical tests, the sub-test will only be performed once for the plurality of logical tests, failure of the sub-test by an instruction indicating that each of the plurality of logical tests is satisfied.

12 Claims, 2 Drawing Sheets

APPARATUS AND METHOD FOR CHECKING MICROCODE WITH A GENERATED RESTRICTION CHECKER

FIELD OF THE INVENTION

The invention relates to a restriction checker generator for generating a restriction checker for checking microcode instructions against a list of restrictions which they must satisfy in order to be valid.

BACKGROUND OF THE INVENTION

The nature of the horizontal microcode (HMC) used in modern, highly complex and highly parallel data processors, such as the IBM Application System/400, is such that not all combinations of control word field encodes result in a meaningful control word. Thus, in order to be valid, each microcode instruction must satisfy a set of restrictions including, but not limited to, those imposed by the design of the processor. These restrictions can arise due to the architecture of the processor, for example they can be restrictions on data movement, even if only to prevent bus clashes. In addition, ad hoc restrictions can be introduced during design of the processor to circumvent hardware problems or to enable certain hardware optimizations to be made. The restrictions could also be imposed by, for example, requirements that the microcode meet certain coding standards or conventions.

The efficient checking of restrictions against a set of microcode instructions is a significant problem. The set of restrictions is generally very large and can change frequently, particularly during development of a processor.

Conventionally, a hand-written checking program is used to check the microcode against the restriction set. This checking program, when executed on a computer, accepts a representation of a microcode instruction or control word and generates a list of those restrictions, if any, which are violated by the instruction.

However, each time the restriction set is changed the checking program must be modified to reflect these changes. Modification of the checking program is generally a laborious and time consuming process because usually the information embedded in such a program is too implicit to be reused or modified in an effective manner. If development of the microcode is taking place in parallel with development of the processor, as is usually the case, it can introduce a significant delay in the processor reaching the market.

SUMMARY OF THE INVENTION

The present invention enables a restriction checker generator to be provided for generating a restriction checker for checking microcode instructions, each comprising a number of fields, against a number of restrictions on the values the fields can take, which restrictions each microcode instruction must satisfy in order to be valid, the restriction checker generator comprising means for generating, from information representing the restrictions, a computer program which, when executed on a computer, performs the function of a restriction checker.

The restriction checking program can be rapidly regenerated in the event of a change in the restriction set. The generated program can be executed on a general purpose computer either in batch mode or interactively as part of a microcode editing tool.

In a preferred form of the invention the generating means includes means for transforming information representing each restriction into at least one logical test for the instruction, each logical test comprising a number of sub-tests for the values of fields of the instruction such that failure of any one of the sub-tests by an instruction indicates that the restriction is satisfied by the instruction.

When the set of restrictions changes the restriction checker can thus be rapidly modified by transforming the modified information representing the restrictions to a modified set of logical tests and regenerating the computer program.

In general, restrictions are almost always satisfied and violations are relatively rare. Expression of the restrictions in the form of a logical test made up of sub-tests, only one of which needs to be failed for the restriction to be passed, means that, as soon as a sub-test is failed, the remaining sub-tests making up the logical test do not need to be carried out. Therefore, satisfaction of the restriction can be determined as quickly as possible allowing the checker to operate extremely efficiently, even if the set of restrictions is large.

Each logical test can comprise a conjunction of sub-tests, each sub-test evaluating FALSE if the sub-test is failed. Alternatively, each logical test could comprise a disjunction of sub-tests, each sub-test evaluating TRUE if the sub-test is failed.

Usually the format of a microcode instruction is such that there is a unique field which acts as the key to the structure of the remaining fields. If this is the case each logical test should contain a sub-test for the value of this field and in an advantageous form of the invention the means for transforming the information into the logical tests includes means for appending a precondition sub-test, for the value of a predefined key-field of the instruction, to each logical test, failure of which precondition sub-test by an instruction indicates that the logical test is not applicable to the instruction, the precondition sub-test being the first sub-test of the logical test to be performed.

The sub-tests can be set membership tests in which the values of fields of the instruction are tested for membership of a predefined set of possible values for that field or arithmetic tests for the values of the fields of the instruction.

The number of distinct sub-tests occurring in a set of restrictions is generally small in comparison with the number of restrictions. Accordingly, in a preferred form of the invention the generator further includes means for factorizing the logical tests so that, for at least some of the sub-tests, if the same sub-test occurs in a plurality of the logical tests, the sub-test will only be performed once for the plurality of logical tests, failure of the sub-test by an instruction indicating that each of the plurality of logical tests is satisfied. In the embodiment of the invention, the means for factorizing comprises: means for selecting from a set of logical tests those that contain a particular sub-test C; means for generating a set of violation messages for the selected logical tests consisting only of the sub-test C; means for generating a set of modified logical tests, each corresponding to one of the selected logical tests and comprising all the sub-tests comprising the corresponding logical test except for the sub-test C, the set of modified logical tests being performed and the set of violation messages being associated with an instruction only if the sub-test C is not failed by the instruction.

The restriction checker generator can also include: storage means for storing the information representing the restrictions; means for generating the computer program from the logical tests; storage means for storing the computer program.

The invention also enables a restriction checker to be provided including the above restriction checker generator.

BRIEF DESCRIPTION OF THE DRAWINGS

An embodiment of the invention will now be described by way of example, with reference to the accompanying drawings, wherein.

DETAILED DESCRIPTION OF THE PREFERRED EMBODIMENT

Figure 1:
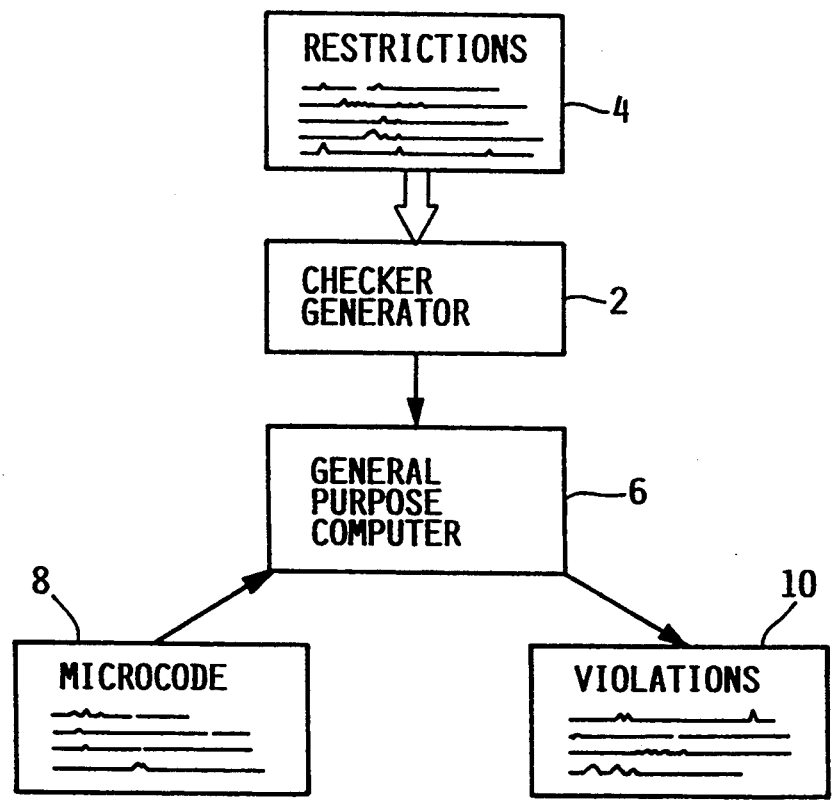
FIG. 1 is a schematic diagram showing a restriction checker including a restriction checker generator in accordance with the invention.

Referring to FIG. 1, there is shown a restriction checker incorporating a restriction checker generator in accordance with the invention.

Information representing a set of restrictions is stored in storage device 4. In this embodiment of the invention, restriction checker generator 2 accesses this information and generates from it a computer program which is passed to, and executed by, general purpose computer 6. The program causes the computer 6 to take as input microcode instructions 8, check them, and generate violation messages 10 for any restrictions which are violated by the microcode.

Figure 2:
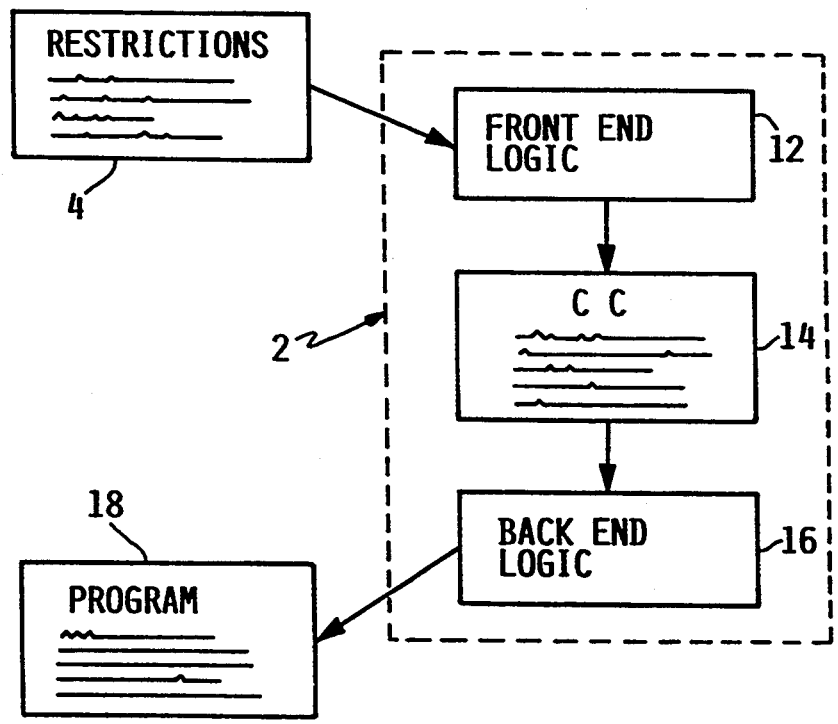
FIG. 2 is a schematic diagram of a restriction checker generator in accordance with the invention.

FIG. 2 is a schematic diagram showing the restriction checker generator 2. Front end logic 12 takes as input a list of restrictions stored in storage device 4 and transforms them into an optimized computational form comprising a list of logical tests 14, each one comprising a conjunction of a number of sub-tests for fields of an instruction. Each logical expression has the characteristic that it evaluates FALSE if the restriction is satisfied by an instruction and TRUE if the restriction is not satisfied by an instruction. Back end logic 16 takes this list of logical expressions and generates from it a restriction checking program which it stores in storage means 18.

In this embodiment of the invention the restriction checker generator also takes the form of a computer program running on a general purpose computer, thus storage devices 4 and 18 are, in this case, parts of the memory of the computer and the back end and front end logic are, in this case, the processor of the computer when different sections of the program are executing.

However, it should be noted that the restriction checker generator 2 itself could take the form of dedicated hardware devices or, indeed, any combination of dedicated hardware and appropriate software.

Each horizontal microcode control word is a record made up of a sequence of fields. Each field of a record has an associated name and value. The format of a record is defined to be the list of names of the fields of which the record consists. Each record contains a key field which has a particular name which is the same for all the records. The value of the key field determines the format of the record; i.e., there exists a mapping from the key field names to lists of field names. Each restriction consists of a Boolean condition on the values of the fields making up tile control word and an associated violation message.

In general, a restriction can be expressed as an applicability condition and a restriction condition. Each applicability condition implies its restriction condition in the sense that if the applicability condition is satisfied then the restriction condition must be true, else the restriction has been violated.

Both applicability and restriction conditions have the same form: they are constructed from conjunctions, disjunctions, parentheses and two kinds of basic clauses. The basic clauses are the following.

(1) The testing of the value of a field against a set of possible values for the field. This kind of clause may be used to state that a particular field must have a value which is contained in a particular set of values, or that its value is not contained in a particular set of values. That is, the test can be either positive or negative. This kind of clause will be referred to as a set clause;

(2) An arbitrary condition expressed in a general purpose programming language, for example C. Keywords are used to delimit a piece of text which is to be interpreted as an expression which evaluates to either TRUE or FALSE. This kind of clause is called an arithmetic clause. Arithmetic clauses are used when the set clause format is too limiting or cumbersome. For example, if it is required to test whether a field value is odd or even this is much more conveniently done using a conventional programming language, such as C, rather than in set form. Arithmetic clauses may refer to record fields by name.

In addition to a condition as described above, each restriction has associated with it some information which uniquely identifies the restriction, and a violation message. If a restriction is violated, the checking program prints out text which identifies the restriction and which contains the violation message of the restriction.

In the embodiment of the invention the following syntax is used to represent the restrictions:

| STATIC_CONSTRAINT | | |
|---|---|---|
| [<antecedent>=>] | <consequent> | The restriction expression |
| SERIAL | <quoted string> | The restriction identifier |
| REPORT | <quoted string> | The violation message |
| [SPEC | <quoted string>]; | The documentation reference (optional). |

The <antecedent> is the applicability condition; it is optional and the default value is TRUE. If a restriction's antecedent evaluates to TRUE for a particular control word, then the restriction applies to that control word, and the restriction's consequent must then be checked. If the consequent then evaluates to true, the control word is deemed to have satisfied the restriction; otherwise, a violation has occurred.

Both the <antecedent> and <consequent> are made up of basic clauses joined by the conjunction AND and the disjunction OR. These basic clauses can be of three kinds:

(i) <field_id> IN <encode_set>
(ii) <field_id> NOT IN <encode_set>
(iii) <arithmetic_expression>. In the embodiment of the invention this takes the form:

ARITH <C expression> END_ARITH.

The <encode_set> can be either a list of set members, a predefined set name or a union of other <encode_set>s.
[Thus, examples of restrictions in the syntax of the embodiment of the invention would be:

```
STATIC_CONSTRAINT
    datamode IN {dw} => pcode IN {mv}
    SERIAL "dw(1)"
    REPORT "if datamode in {dw} then opcode must be in
        {mv}";
STATIC_CONSTRAINT
    datamode IN {'6b'} AND opcode IN {ba}
        => ba-leftalu IN {br(bp1),br(bp2),svu,
            sv(2),br(#)}
    SERIAL "6b(1)"
    REPORT "if datamode in [6b] and opcode in {ba}
        then leftalu must be in {br(bp1),br(bp2),
        svu,sv(2),br(#)}";
``` where datamode, opcode and ba_leftalu are all field identifiers.]

The restrictions represented in this form and stored in storage device 4 are each transformed by the front end logic 12 to at least one simplified intermediate logical test, which in this particular embodiment comprises a conjunction of simple clauses or sub-tests. This form for the restrictions will be referred to here as the Computational Condition (CC) form. A CC is defined by the following rules:

(i) If a CC evaluated to FALSE then the CC is deemed to have been satisfied,
(ii) If a CC evaluates to TRUE then the CC is deemed to have been violated,
(iii) Each CC has at most one set membership test for each field,
(iv) The sets referred to by the set membership tests are represented as bit vectors whose length in bits corresponds to the number of encode mnemonics valid for that field. Each bit of the vector corresponds to the presence or absence of a particular mnemonic in the set.
(v) Each CC refers to a violation descriptor which is a representation of the restriction identifier serial, violation report and restriction documentation reference of the restriction from which the CC originated.

Figure 3:
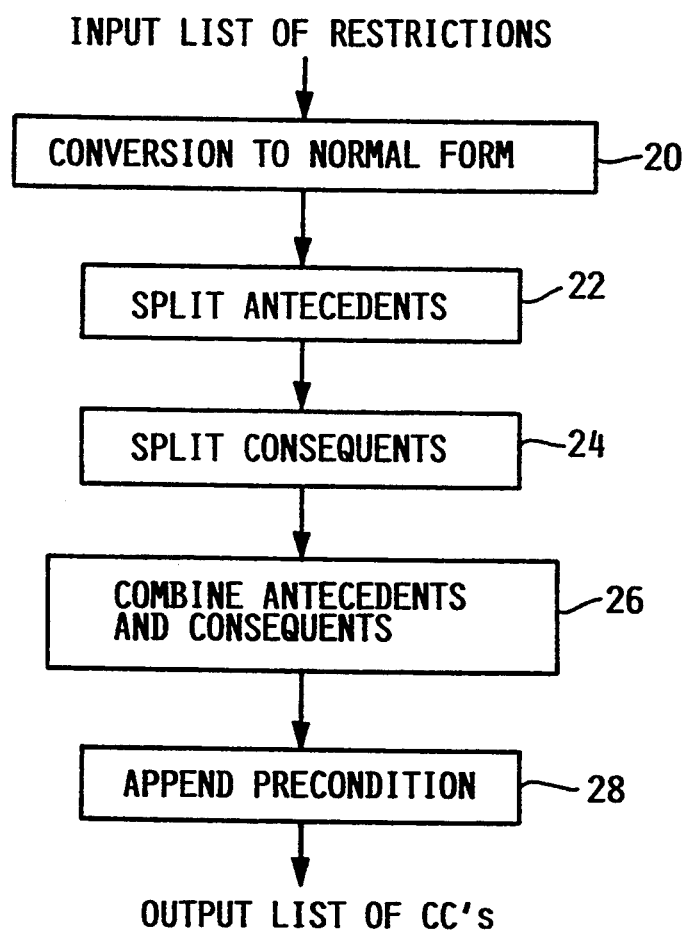
FIG. 3 is a flow chart showing the transformation stages performed by the front end logic.

The front end logic 12 transforms each restriction to the CC structure in four stages. These four stages are illustrated in the flow diagram, FIG. 3.

In the first stage 20 each antecedent of each restriction is converted to disjunctive normal form (DNF) and each consequent converted to conjunctive normal form (CNF). This conversion is performed by repeated flattening of restrictions, merging conjunctions or disjunctions wherever possible, elimination of parentheses and distribution. A conjunction of disjunctions may be distributed to form a disjunction of conjunctions, the number of conjuncts being exponential in the original number of disjuncts. Similarly a disjunction of conjunctions may be distributed to form a conjunction of disjunctions.

At this point each restriction is of the form DNF≧CNF, although the antecedent might, by default, be TRUE.

In the second stage 22 of the conversion to CC form each antecedent in DNF is split into its component conjunctions, for example conjunction1 OR conjunction2 ≧ <consequent> would be split into the pair of restrictions, conjunction1 ≧ <consequent> conjunction2 ≧ <consequent>.

The result is thus a number of restrictions, each with a simple conjunction of clauses as an antecedent. This simplicity is at the price of additional restrictions. When extra restrictions are created, it is necessary to preserve the links of the new restrictions to the descriptors of the original restrictions from whence they came.

In the third stage 24 of the conversion to CC each consequent in CNF is split into its component disjunctions, thus conjunction ≧ disjunction1 AND disjunction2 would be split into the pair of restrictions, conjunction ≧ disjunction1 conjunction ≧ disjunction2.

The result of this transformation is a pair of restrictions, whose consequents are a simple disjunction of clauses. After this third stage of transformation all restrictions are in the form, disjunction ≧ conjunction.

In the fourth stage 26 of transformation, the antecedents and consequents are combined into a single expression which evaluates TRUE if the restriction is violated and FALSE if the restriction is successfully passed. Effectively, in the transformation to CC, the meaning of truth and falsity in the result of the consequent has been changed. In a restriction, truth implies that the restriction has been passed whereas in the CC, the truth of clauses which originated in the consequent of the restriction implies that the restriction has been violated. This switch of meaning is accomplished by changing the sense of each clause of the consequent of each restriction. Thus the restriction, conjunction ≧ <clause> is changed to, conjunction AND (NOT <clause>)

and conjunction ≧ <clause1> OR <clause2> becomes, conjunction AND (NOT <clause1>) AND (NOT <clause 2>).

No NOT operator is actually used, instead the sense of each consequent clause is changed. This is accomplished by switching the sense of set membership tests from IN to NOT_IN and vice versa and by adding parentheses and a negation symbol to arithmetic expressions.

After the fourth stage 26 each restriction is in the form of at least one logical expression comprising a conjunctive list of clauses.

A restriction might refer to fields which are not defined for a given record. The result of this is that a particular restriction might be relevant only to certain kinds of record; i.e., it might be relevant only to certain kinds of key field values. For other kinds of record, denoted by inappropriate key values, the restriction simply does not need to be checked. To ensure that a minimum of computation is performed during checking a basic clause is appended in step 28, by the front end logic 1, to the beginning of each CC which states to which values of the key field this restriction is relevant. This appended basic clause will be referred to as the 'precondition'. If the precondition is satisfied for a given control word then all the fields referred to by the clauses of the CC are defined by this control word. If the precondition is not satisfied; i.e., the clause of the CC representing the precondition evaluates to FALSE, then by the semantics of a CC this CC is passed and no further evaluation of the clauses of this CC is required. Thus if the precondition is the first clause of each CC to be evaluated, consideration of other clauses of the CC will only occur if all fields referred to by them are defined.

The representation of each set referred to by a set clause of a CC is converted to bit vector form for efficiency of checking. Once each set is represented as a bit pattern the negative set clauses may be transformed into positive ones by simply inverting the set. An upper bound on the size of a set is provided by predefined lists of valid mnemonic values which each field may use. Set clauses of restrictions which test the same field may be conveniently merged at this point by merging the tests into a single clause which uses the intersection of the sets of the tests which have been replaced.

In this form the CCs are passed to the back end logic 16 for generation of the checking program.

The task of the back end logic 16 is to take the list of logical tests in the CC form generated by the front end logic 12 and produce from these a computer program which, when executed on a computer, checks a record or instruction against these restrictions.

The simplest form of checker program would simply check each restriction in the computational condition form one by one against all the instructions to be checked. The embodiment of the invention however takes advantage of the structure of the computational conditions to generate a more efficient program.

A reduction algorithm is used recursively by the back end logic to factorize the logical tests so that if the same sub-test occurs in a set of logical tests, the sub-test will only be performed once for the set of logical tests. Failure of the sub-test in one of the tests means that the rest of the set of logical tests are satisfied. In other words, if two or more clauses refer to the value of the same field in the record, the value need only be checked once for all restrictions. It will be established by this one check that some of the restrictions are satisfied and no further checks involving them will have to be performed. For the other restrictions, the reduction algorithm can be applied recursively.

Thus, the aim of the reduction algorithm is to transform a naive program that checks all the restrictions one by one into a program that arranges the restrictions in a hierarchy to enable a more sophisticated checking of the restrictions.

In this embodiment of the invention, the reduction algorithm used by the back end logic applies to set clauses. Arithmetic clauses are not changed during application of the reduction algorithm.

A general set clause c is equivalent to $x \in S$ where x is a variable value of one of the fields in the record which can takes values from a set $U_x$ of all possible values for that field and S is a subset of $U_x$.

The set clause c evaluates to TRUE if and only if x is defined and the value of x is an element of set S. In all other cases the clause evaluates to FALSE.

A restriction r in the CC form is a set of clauses $\{c_1, \ldots, c_k\}$ where $c_i \equiv x_i \in S_i$ and all the $x_i$ are values of different fields in the record. If any of the clauses in r evaluate FALSE, then the restriction r is satisfied. The restriction r is violated if and only if all clauses in the set evaluate to TRUE, in which case the a violation message v associated with r is produced.

Given a set R of restrictions $\{r_1, \ldots, r_m\}$ and an assignment $x_j = a_j$ for some of the variables $x_j$ that appear in clauses of restrictions in R, the task of the restriction checker is to check whether the assignment violates any of the restrictions and if so to produce the violation messages for the violated restrictions.

The checker program generated by the back end logic involves the following two basic procedures:

do(R)—this procedure, with R a set of restrictions, checks all restrictions in R one by one and produces any necessary violation messages. If R is empty then do(R) is null. The simplest form of checker program thus would be the procedure do(R);

message(V)—this procedure, with V a set of violation messages, produces all messages in V.

Figure 4:
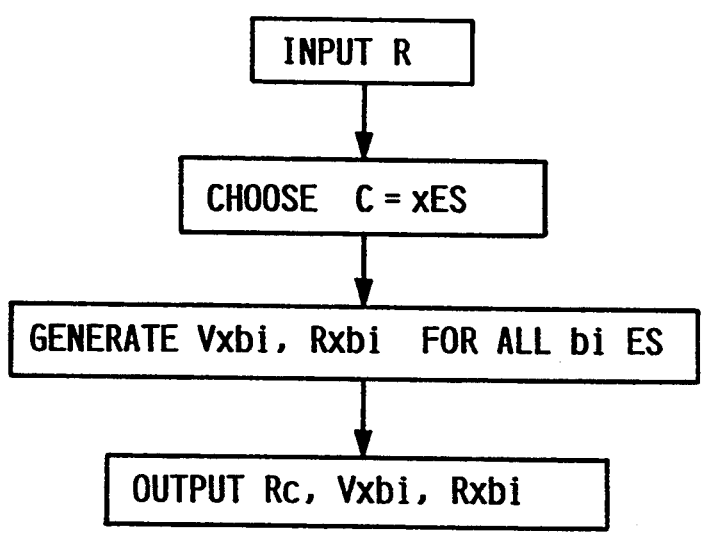
FIG. 4 is a flow chart showing the reduction algorithm employed by the back end logic.

The factorization method used by the back end logic 16 to generate an equivalent, though more efficient, procedure to do(R) is illustrated in the flow diagram FIG. 4 and comprises of the following steps:

1. A set clause $c \equiv x \in S$, where x is a variable and S is the set $\{b_1, \ldots, b_n\}$ of possible values for x, is chosen which appears in at least one restriction of R;
2. R is divided into two sets of restrictions. The first set Rx including all restrictions in R that include the clause c. The second set R'x including all restrictions in R that are not in Rx; i.e., that do not contain the clause c;
3. For all the possible values $b_i$ of x belonging to the set S, the sets $R_{x,bi}$ and $V_{x,bi}$ are constructed in the following steps;
   (i) At the start of the procedure $R_{x,bi}$ and $V_{x,bi}$ are empty.
   (ii) For all $r \in R_x$ the following steps are performed:
      1. If the clause c is the only clause of r, and v is the associated message of r then: for all $b_i \in S$, v is put into $V_{x,bi}$;
      2. If the clause c is not the only clause of r then:
         a. A set of clauses r' is created by deleting the clause c from the set of clauses defining r,
         b. for all $b_i \in S$, r' is put into $R_{x,bi}$.
4. The following procedure is generated from $R'_x$, $R_{x,bi}$, and $V_{x,bi}$ which is semantically equivalent to do(R)

```
        do(R'x);
        switch(x)
            case b1: do(Rx,b1)
                    message(Vx,b1);
                    break;
                .
                .
                .
            case bn: do(Rx,bn);
                    message(Vx,bn);
                    break;
        end switch.
```

This reduction or factorization algorithm is applied recursively to the thus generated do procedures. The reduction algorithm increases the speed of operation of the generated checker program. At the same time, however, the memory required by the checker program is also increased. Accordingly, the process of reapplication of the algorithm is stopped when an appropriate balance is obtained between memory usage by the checker program and the speed at which it runs.

The generated program is stored in storage device 18 and is executed on general purpose computer 6 whenever it is needed to check a microcode instruction. The program may be executed in batch mode to check a large number of instructions or, alternatively, may be incorporated in an editing tool for editing microcode instructions, the program being invoked interactively whenever it is required to check any particular instruction.

What is claimed is:

1. An apparatus for checking the format of computer microcode, comprising:
   means for receiving a plurality of restrictive conditions which said microcode must satisfy;
   means for automatically transforming each said plurality of restrictive conditions into one or more logical expressions, wherein said means for automatically transforming each said plurality of restrictive conditions into one or more logical expressions further includes means for transforming each said plurality of restrictive conditions into one or more logical tests, each comprising a number of sub-tests for the values of fields of the instruction, each logical test and sub-test having the characteristics of evaluating FALSE if the restriction is satisfied wherein an evaluation of FALSE of any one of the sub-tests by an instruction indicates that the restriction is satisfied by the instruction;
   means for receiving a plurality of computer microcode instructions as input;
   means for automatically generating a restriction checker program from said logical expressions for verifying whether each of said microcode instructions satisfies said plurality of restrictive conditions: and
   means for outputting the results of said verification.

2. The apparatus for checking the format of computer microcode of claim 1, wherein said logical tests generated by said means for transforming each said plurality of restrictive conditions into one or more logical tests further comprises a number of sub-tests, said sub-tests including a precondition sub-test, for the value of a predefined key-field in the instruction, a determination of false of which precondition sub-test by an instruction indicates that one or more of the logical tests is not applicable to the instruction, the precondition sub-test being the first sub-test of the logical test to be performed.

3. The apparatus for checking the format of computer microcode of claim 1, wherein said logical tests generated by said means for transforming each said plurality of restrictive conditions into one or more logical tests further comprises a number of sub-tests, said sub-tests including arithmetic tests for values of arithmetic fields of the instructions.

4. The apparatus for checking the format of computer microcode of claim 1, wherein said logical tests generated by said means for transforming each said plurality of restrictive conditions into one or more logical tests further comprises a number of sub-tests, said sub-tests including set membership tests for an instruction having a field which contains values from a particular set of values, and wherein the means for automatically transforming each of said plurality of restrictive conditions into one or more logical expressions comprises means for merging set membership tests, for a given field of an instruction, within a logical test so that, after transformation, each logical test comprises at most one set membership test for each field of the instruction.

5. The apparatus for checking the format of computer microcode of claim 1, wherein the means for automatically transforming each of said plurality of restrictive conditions into one or more logical expressions comprises means for factorizing the logical tests so that, for at least some of the sub-tests, if the same sub-test occurs in a plurality of the logical tests, the sub-test will only be performed once for the plurality of logical tests, a determination of false of the sub-test by an instruction indicating that each of the plurality of logical tests is satisfied.

6. The apparatus for checking the format of computer microcode of claim 5, wherein the means for factorizing comprises:
   means for selecting from a set of logical tests those that contain a particular sub-test C;
   means for generating a set of violation messages for the selected logical tests consisting only of the sub-test C when the sub-test C evaluates as true;
   means for generating a set of modified logical tests, each corresponding to one of the selected logical tests and comprising all the sub-tests comprising the corresponding logical test except for the sub-test C, the set of modified logical tests being performed for and the set of violation messages being associated with an instruction only if the sub-test C evaluates as true by the instruction.

7. The apparatus for checking the format of computer microcode of claim 6, wherein said particular sub-test C is the sub-test that appears in the largest number of logical tests in the set.

8. A method for checking the format of computer system microcode with a data processing system, comprising the steps of:
   identifying a plurality of restrictive conditions which said microcode must satisfy;
   transforming each said plurality of restrictive conditions into one or more logical expressions; and
   converting said logical expression into a restriction checker program;
   inputting a plurality of unverified microcode instructions;
   executing said restriction checker program on said plurality of unverified microcode instructions;

determining, using said restriction checker program, with respect to each of said plurality of microcode instructions, if any microcode instructions satisfy said plurality of restrictive conditions; and outputting, from said restriction checker program, data indicating which of said microcode instructions fail to satisfy said plurality of restrictive conditions wherein said logical expressions may include a precondition sub-test, for the value of a predefined key-field of the instruction, an evaluation as false of which precondition sub-test by an instruction indicates that the logical expression is not applicable to the instruction.

9. The method for checking the format of computer system microcode with a data processing system of claim 8, wherein said step of transforming each said plurality of restrictive conditions into one or more logical expressions comprises transforming each said plurality of restrictive conditions into one or more logical tests, each logical test expressed as a plurality of sub-tests, wherein an evaluation as false of any one of the sub-tests by a microcode instruction indicates that the restriction is satisfied by the instruction.

10. The method for checking the format of computer system microcode with a data processing system of claim 9, wherein said sub-tests from the step of transforming each said plurality of restrictive conditions into one or more logical tests may include set membership tests for an instruction having a field which contains values from a particular set of values, said step of transforming each said plurality of restrictive conditions into one or more logical tests further comprises the step of merging set membership tests, for a given field of an instruction, within a logical test so that, after transformation, each logical test comprises at most one set membership test for each field of the instruction.

11. The method for checking the format of computer system microcode with a data processing system of claim 9, wherein said step of transforming said plurality of restrictive conditions into one or more logical expressions comprises the step of factorizing the logical tests so that, for at least some of the sub-tests, if the same sub-test occurs in a plurality of the logical tests, the sub-test will only be performed once for the plurality of logical tests, failure of the sub-test by an instruction indicating that each of the plurality of logical tests is satisfied.

12. The method for checking the format of computer system microcode with a data processing system of claim 11, wherein the step of factorizing the logical tests comprises:

selecting from a set of logical tests those that contain a particular sub-test C;

generating a set of violation messages for the selected logical tests consisting only of the sub-test C when the sub-test C evaluates as true; and generating a set of modified logical tests, each corresponding to one of the selected logical tests and comprising all the sub-tests comprising the corresponding logical test except for the sub-test C, the set of modified logical tests being performed for and the set of violation messages being associated with an instruction only if the sub-test C evaluates as true by the instruction.

* * * * *